US006958997B1

(12) United States Patent
Bolton

(10) Patent No.: US 6,958,997 B1
(45) Date of Patent: Oct. 25, 2005

(54) TCP FAST RECOVERY EXTENDED METHOD AND APPARATUS

(75) Inventor: Derek W. Bolton, Sydney (AU)

(73) Assignee: Cisco Technology, Inc., San Jose, CA (US)

(*) Notice: Subject to any disclaimer, the term of this patent is extended or adjusted under 35 U.S.C. 154(b) by 772 days.

(21) Appl. No.: 09/610,301

(22) Filed: Jul. 5, 2000

(51) Int. Cl.$^7$ .............................................. H04L 1/16
(52) U.S. Cl. ...................... 370/392; 714/746; 714/748
(58) Field of Search ............................... 714/746–751; 370/229, 231

(56) References Cited

U.S. PATENT DOCUMENTS

| | | | | |
|---|---|---|---|---|
| 6,078,564 A | * | 6/2000 | Lakshman et al. | 370/235 |
| 6,438,101 B1 | * | 8/2002 | Kalampoukas et al. | 370/229 |
| 6,493,316 B1 | * | 12/2002 | Chapman et al. | 370/231 |
| 6,646,987 B1 | * | 11/2003 | Qaddoura | 370/231 |
| 2003/0022628 A1 | * | 1/2003 | Mamiya et al. | |

OTHER PUBLICATIONS

S. Floyd et al., "The NewReno Modification to TCP's Fast Recovery Algorithm," RFC 2582, IETF Network Working Group, Apr. 1999.*
S. Johnson, "Increasing TCP Throughput By Using An Extended Acknowledgment Interval," Master's Thesis, Ohio University, Jun. 1995.
M. Mathis et al., "TCP Selective Acknowledgment Options," RFC 2018, IETF Newtwork Working Group, Oct. 1996.
S. O'Malley et al., "TCP Extensions Considered Harmful," RFC 1263, IETF Network Working Group, Oct. 1991.
V. Jacobson et al., "TCP Extensions for High Performance," RFC 1323, IETF Network Working Group, May 1992.
K. Ross et al., "Computer Networking: A Top–Down Approach Featuring the Internet," Section 3.5 ("Connection– Oriented Transport: TCP"), Section 3.7 ("TCP Congestion Control"), Addison–Wesley, 1999.

* cited by examiner

Primary Examiner—Bob Phunkulh
Assistant Examiner—Joshua Kading
(74) Attorney, Agent, or Firm—Hickman Palermo Truong & Becker LLP

(57) ABSTRACT

A fast recovery extended method is used to enhance the performance of TCP fast recovery when multiple segment losses occur within a single round trip time between a TCP sender and a TCP receiver. A TCP fast recovery process is performed by a TCP sender, and then a TCP fast recovery extended process is performed by the TCP sender upon receiving acknowledgement of receipt of new data from a TCP receiver in the TCP fast recovery process. The fast recovery extended process determines, following receipt of the acknowledgement of receipt of new data, an excess number of duplicate acknowledgements based upon a count of consecutive duplicate acknowledgement packets. The fast recovery extended process takes a network packet transmission recovery action based upon the excess number of duplicate acknowledgements, and then stores the excess number of duplicate acknowledgements as a number of duplicate acknowledgements for further use.

34 Claims, 5 Drawing Sheets

TCP FAST RECOVERY EXTENDED METHOD AND APPARATUS

BACKGROUND OF THE INVENTION

1. Field of the Invention

This invention relates generally to methods used in implementation of the network Transmission Control Protocol, and more specifically to congestion control methods used in the Transmission Control Protocol.

2. Description of Related Art

The network Transmission Control Protocol (TCP) is well known. TCP runs only in end systems 100, 110 on a network 120 and not in intermediate network elements such as routers or bridges. The intermediate network elements do not maintain TCP connection state. A TCP connection between end systems 100, 110, sometimes called hosts 100, 110, provides full duplex data transfer between hosts 100, 110. A TCP connection is always point-to-point, i.e., between a single TCP sender and a single TCP receiver.

When a TCP connection is established, two application processes 101, 111 can send data to each other. Data is transmitted in segments. A segment includes header fields and a data field. The data field contains application data. The amount of application data that can be placed in the segment data field by the TCP sender is a maximum segment size. The TCP sender monitors flow control by monitoring an advertised receive window rwnd for the TCP receiver, which is the size of the TCP receive buffer.

Two header fields of interest are the sequence number field and the acknowledgement number field. As is known, in TCP, data is viewed as an unstructured, but ordered, stream of bytes. The sequence numbers used in TCP are over the stream of transmitted bytes. The sequence number that is placed in the segment number field is the byte-stream number of the first byte in the segment.

The acknowledge number placed in the acknowledgement number field, for example by host 110 in an acknowledgement packet being transmitted to host 100, is the sequence number of the next byte of data that host 110 is expecting from host 100. Since according to TCP, host 110 only acknowledges bytes up to the first missing byte in the data stream, host 110 may provide cumulative acknowledgements of a single segment when segments are received out of order, the cumulative acknowledgements for the single segment are referred to as duplicate acknowledgements.

Each time host 100 sends a segment into a TCP connection, a timer is started. If the segment timer expires before host 100 receives an acknowledgement for the data in the segment from host 110, host 100 resends the segment and initiates a slow start process. Typically, the timeout value for the timer is not much larger than a round-trip time between hosts 100 and 110. The round-trip time is the time from when a segment is transmitted to when an acknowledgement for that segment is received.

A segment can fail to reach host 110 due to data corruption or more usually as a result of network congestion. Most losses on the Internet are caused by congestion as routers run out of buffers and discard incoming traffic.

TCP typically runs on top of the Internet Protocol (IP). TCP must use end-to-end congestion control because the IP layer provides no feedback to end systems concerning network congestion. Four TCP congestion control processes are described in Request for Comments(RFC) 2581. The four are slow start, congestion avoidance, fast retransmit, and fast recovery.

Typically, for slow start, a slow start threshold ssthresh is maintained and for congestion avoidance, a congestion window cwnd is maintained for each connection. Congestion window cwnd is a sender side limit on the amount of data that the TCP sender can transmit into network 120 before receiving an acknowledgement.

When a TCP receiver 110 receives an out-of-order segment, TCP receiver 110 generates an immediate acknowledgement for the first missing segment, which is a duplicate acknowledgement. Since TCP sender 100 does not know whether the duplicate acknowledgement is caused by a lost segment, a reordering of the segments during transmission, or replication of an acknowledgement packet or a segment by network 120, TCP sender 100 waits to receive a small number of duplicate acknowledgements, typically three, before assuming a segment is lost. If a reordering of the segments is the problem, there are only one or two duplicate acknowledgements before the reordered segment is processed and a new acknowledgement generated.

When the third duplicate acknowledgement is received, the TCP sender immediately retransmits the oldest unacknowledged segment without waiting for the segment transmission timer to expire. This is known in the art as a fast retransmit.

Following the fast retransmit, fast recovery, but not slow start, is performed. Fast recovery governs the transmission of data by TCP sender 100 until a non-duplicate acknowledgement is received.

When one or more segments are lost in network 120, network 120 is assumed congested by TCP sender 100. After recovery from the loss, TCP's congestion avoidance mechanism arranges to continue transmission at half the rate, which was obtained previously. The objective of fast recovery is to maintain transmission (at the reduced rate) while the recovery is being performed.

In fast recovery, the size of congestion window cwnd is reduced and slow start threshold ssthresh is set equal to the reduced size congestion window. As soon as is possible with the reduced size congestion window, another packet is transmitted over the network in response to each additional duplicate acknowledgement packet received from TCP receiver 110, and the size of congestion window cwnd is increased by the size of one segment. The principle behind this is that each duplicate acknowledgement implies the receiver has received a segment although the sender does not know which one. Since this means that a segment has left the network, the sender can insert one more segment without worsening the congestion.

When a non-duplicate acknowledgement is received by TCP sender 100, congestion window cwnd is deflated by setting window equal to slow start threshold ssthresh, and the number of duplicate acknowledgements is set to zero. If only a single segment is lost in a round trip time, fast retransmit and fast recovery perform satisfactorily and data transmission continues at the reduced rate in an attempt to avoid congestion on network 120.

However, fast recovery does not always result in a smooth recovery when there are multiple lost segments in a single round trip time. Since the number of duplicate acknowledgements is set to zero upon leaving fast recovery, TCP sender 100 must receive three new duplicate acknowledgements after termination of fast recovery before TCP sender 100 can determine that another drop has occurred and perform another fast retransmit. If the reduced size congestion window cwnd is such that less than three new segments can be transmitted by TCP sender 100, TCP receiver 110 does not generate three duplicate acknowledgements and a retransmission timeout occurs. Similarly, if the new drop occurs almost a round trip time after the first drop, there may not be sufficient time available for generation of three duplicate acknowledgements, and again a retransmission timeout occurs.

As network congestion increases, and multiple drops in a single round trip time occur, the performance of network 120 is degraded because fast recovery cannot handle multiple drops in a single round trip time. Hence, a new method is needed for recovering from such a situation.

SUMMARY OF THE INVENTION

According to the principles of this invention, a novel fast recovery extended method is used to enhance the performance of TCP fast recovery when multiple segment losses occur within a single round trip time between a TCP sender and a TCP receiver. Unlike the prior art fast recovery technique that worked well in only limited circumstances, the fast recovery extended method enhances recovery for second and subsequent segment losses within a single round trip time.

In one embodiment, a transmission control protocol congestion avoidance method includes performing a TCP fast recovery process by a TCP sender, and performing a TCP fast recovery extended process by the TCP sender upon receiving acknowledgement of receipt of new data from a TCP receiver in the TCP fast recovery process. The fast recovery extended process determines, following receipt of the acknowledgement of receipt of new data, an excess number of duplicate acknowledgements based upon a count of consecutive duplicate acknowledgement packets. The fast recovery extended process takes a network packet transmission recovery action based upon the excess number of duplicate acknowledgements, and then stores the excess number of duplicate acknowledgements as a number of duplicate acknowledgements for further use in congestion avoidance.

The network packet transmission recovery actions include:

Taking no further action;
Deflating a size of a congestion window cwnd;
Optimizing a size of the congestion window cwnd;
Performing a second fast retransmit;
Resizing the optimized size congestion window cwnd; and
Resizing the deflated size congestion window cwnd.

Also, only the TCP sender needs to have the fast recovery extended method available. No changes are required of a TCP receiver. The retention and use of the knowledge provided by the number of duplicate acknowledgements results in a smoother and faster recovery from multiple losses in a single round trip time than was previously possible. Consequently, the fast recovery extended method of this invention makes more efficient use of the network, and improves throughput for the individual user.

In another embodiment, a transmission control protocol method includes performing a TCP fast recovery process, and performing a TCP fast recovery extended process upon receiving acknowledgement of receipt of new data in the TCP fast recovery process.

According to the principles of this invention, a network device includes a processor and a memory coupled to the processor. The memory stores a fast recovery extended method wherein upon execution of the fast recovery extended method by the processor a fast recovery process is extended. The memory is either a volatile memory, a non-volatile memory, or a device includes a network interface. The fast recovery extended method stored in the memory includes determining, upon receiving acknowledgement of receipt of new data by the network device, an excess-number of duplicate acknowledgements based upon a count of consecutive duplicate acknowledgement packets;

taking a network packet transmission recovery action based upon the excess number of duplicate acknowledgements; and storing the excess number of duplicate acknowledgements in the memory as a number of duplicate acknowledgements.

Another embodiment of the network device of this invention includes means for performing a TCP fast recovery process, and means for performing a TCP fast recovery extended process upon receiving acknowledgement of receipt of new data in the TCP fast recovery process. Yet another embodiment of the network device includes:

means for determining, upon receiving acknowledgement of receipt of new data, an excess number of duplicate acknowledgements based upon a count of consecutive duplicate acknowledgement packets;

means for taking a network packet transmission recovery action based upon the excess number of duplicate acknowledgements; and means for storing the excess number of duplicate acknowledgements as a number of duplicate acknowledgements.

Another feature of this invention is a programmable memory including a fast recovery extended method wherein the fast recovery extended method upon execution includes:

determining, upon receiving acknowledgement of receipt of new data, an excess number of duplicate acknowledgements based upon a count of consecutive duplicate acknowledgement packets;

taking a network packet transmission recovery action based upon the excess number of duplicate acknowledgements; and storing the excess number of duplicate acknowledgements as a number of duplicate acknowledgements.

BRIEF DESCRIPTION OF THE DRAWINGS

Herein, elements with the same reference numeral are the same element.

DETAILED DESCRIPTION

Figure 1:
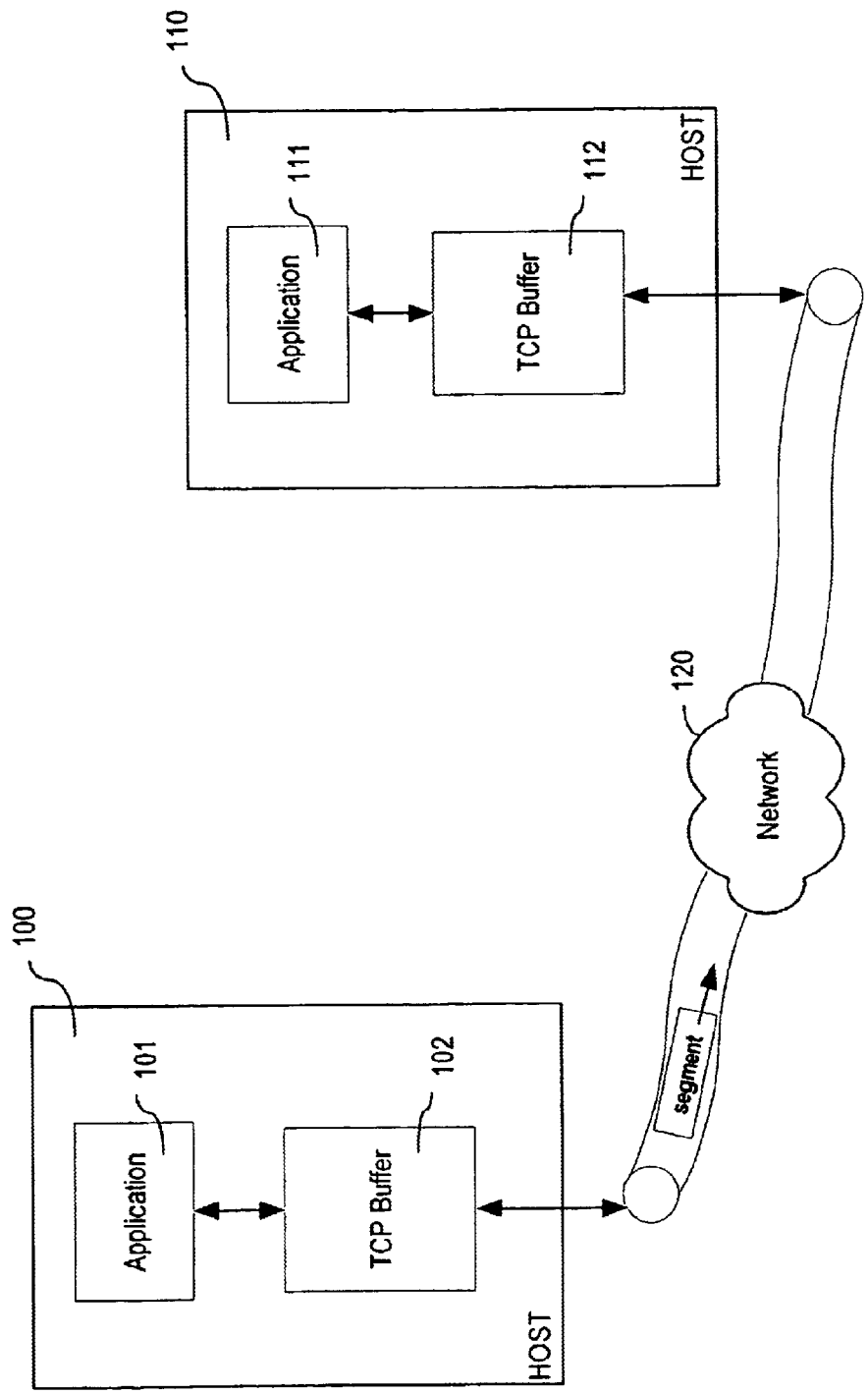
FIG. 1 is a prior art block diagram of two TCP hosts interconnected over a network.

According to the principles of this invention, a novel fast recovery extended method 250 (FIG. 2A) is used to enhance the performance of TCP fast recovery when multiple segment losses occur within a single round trip time between a TCP sender 200, which is a network device, and a TCP receiver 210. Unlike the prior art fast recovery technique that worked well in only limited circumstances, fast recovery extended method 250 enhances recovery for second and subsequent segment losses within a single round trip time.

Fast recovery extended method 250 is used by TCP sender 200 upon receipt of an acknowledgement of receipt of new data by TCP receiver 210 that follows receipt of at least a predefined number of duplicate acknowledgement packets from TCP receiver 210. In particular, fast recovery extended method 250 utilizes information in fast recovery extended state data 251 that is stored in a memory 202 to determine the best way to extend fast recovery. Hence, in contrast to the prior art fast recovery that set the number of duplicate acknowledgements to zero, deflated the congestion window, and terminated following receipt of an acknowledgement of receipt of new data by TCP receiver 210, fast recovery extended method 250 utilizes the information available to recover more efficiently and more smoothly from the loss of data over network 290.

Upon receipt of an acknowledgement packet for the segment retransmitted by a first fast transmit procedure, fast recovery extended method 250 determines whether further processing under fast recovery extended is beneficial. In particular, fast recovery extended method 250 analyzes the number of duplicate acknowledgements received immediately prior to receipt of the acknowledgement of new data, and either terminates fast recovery, or extends fast recovery processing utilizing fast recovery extended state data 251.

In particular, if fast recovery extended state data 251 indicates that further processing by method 250 would be advantageous because there appears to be a second loss within a single round trip time, method 250 adjusts the fast recovery extended state data and continues processing to compensate for the second loss. The network packet transmission recovery actions taken depend upon the values of the adjusted recovery extended state data, as explained more completely, below, but in each instance, recovery is smoother than with prior art techniques, and better data throughput is maintained. Consequently, network 290 is used more efficiently, and an individual user enhanced performance of network 290.

In one embodiment, fast recovery extended method 250 is stored in a memory 202 of a network device that is referred to as TCP sender 200. Fast recovery extended method 250 is executed by processor 201 at an appropriate time, as explained more completely below. An application 225, which also is stored in memory 202, executes on processor 201 and communicates using the network Transmission Control Protocol (TCP) over a network 290 with another application 221 that executes on a processor 211 in a device that is referred to as TCP receiver 210.

The particular configurations of TCP sender 200 and TCP receiver 210 are not essential to this invention. Either or both network devices can be, for example, a computer, a personal digital assistant, a network appliance, a set top box, a telephone, or any other combination of devices that can communicate over a network using TCP. In general, the network device includes a processor, a memory that is volatile, non-volatile, or a combination of the two, and a network interface. The memory is said to be programmable meaning that method 250 can be stored in the memory.

Method 250, or at least a part of method 250, is stored in memory 202 of TCP sender 200. Moreover, while memory 202 is shown as a single unit in FIG. 2A, those of skill in the art will appreciate that memory 202 may be a combination of various units and method 250 may be stored across such units as necessary. For example, method 250 may be stored in a non-volatile memory and executed directly from that memory, may be stored in a non-volative memory and then moved in whole or part into a volatile memory for execution, or may be stored only in a volatile memory and executed from that memory. Similarly, the particular configuration of network 290 is not essential to this invention and can be, for example, a local area network, a wide area network, an intranet, the Internet, or any other-network architecture or combination of network architectures that supports TCP.

Also, only TCP sender 200 needs to have fast recovery extended method 250 available. This is in contrast to an alternative method, selective acknowledgement, which requires that both TCP sender 200 and TCP receiver 210 have selective acknowledgement capability. (Selective acknowledgement reduces redundant transmissions during recovery but does not necessarily avoid retransmission timeouts when multiple drops occur in one round trip time. This is because the procedures defining selective acknowledgement do not use selective acknowledgement to retrigger transmissions.)

According to the principles of this invention, TCP slow start and congestion avoidance initially may follow the prior art path. Consequently, fast recovery extended state data 251 (FIGS. 2A and 2C), sometimes called memory area 251, includes a slow start threshold ssthresh and a congestion window cwnd.

Upon initiation of congestion avoidance by TCP sender 200, each duplicate acknowledgement received from TCP receiver 210 (FIG. 2A) is counted and at least one variable is stored in fast recovery extended state data 251 that is representative of a count of consecutive duplicate acknowledgement packets received by TCP sender 200. In one embodiment, the number of duplicate acknowledgements received is stored as a variable dup_ack. In another embodiment, the number of duplicate acknowledgements received is contained in the size of congestion window cwnd. In yet another embodiment, both variables are stored in memory area 251.

Figure 2A:
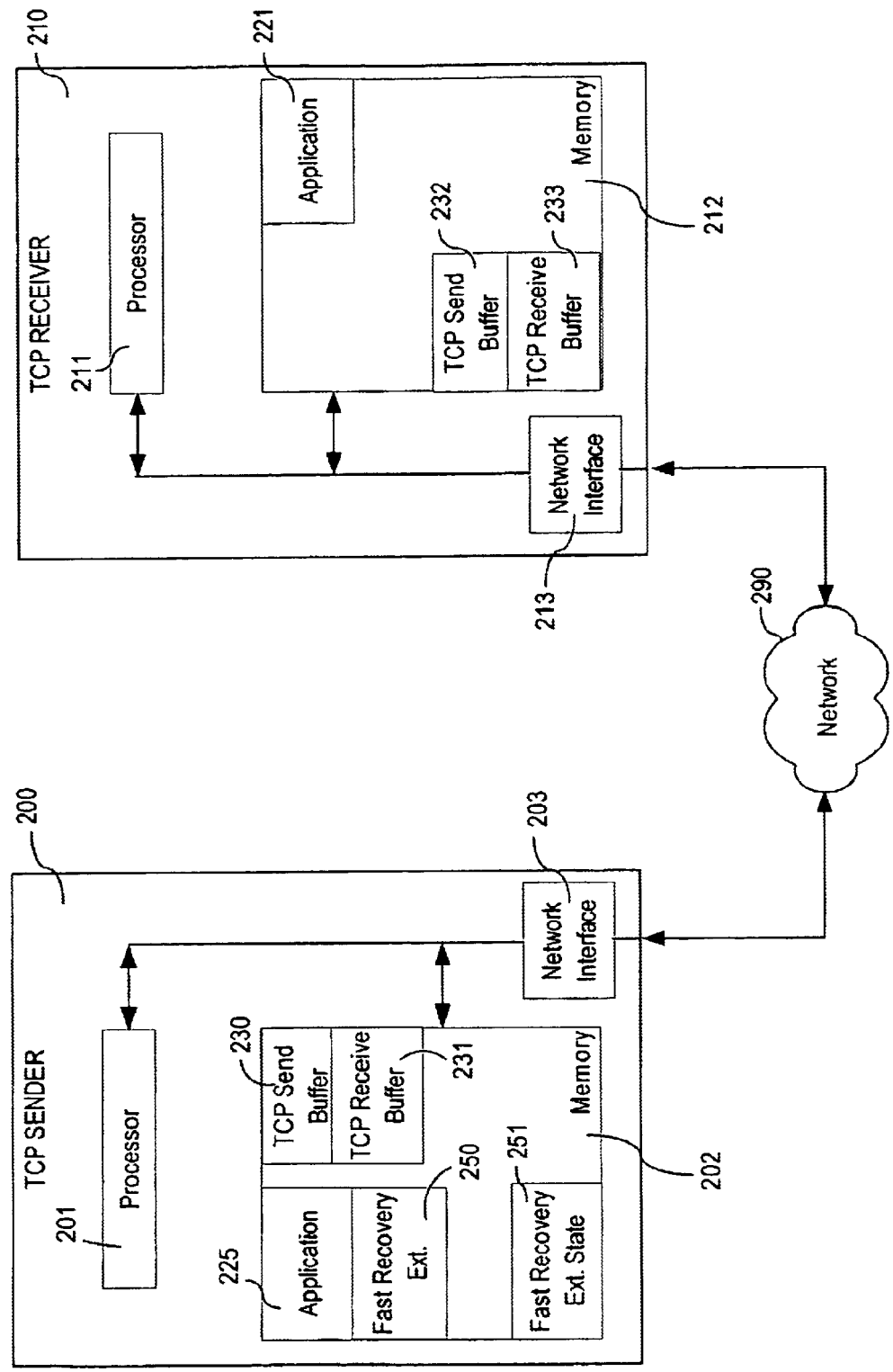
FIG. 2A is a block diagram of a TCP sender and receiver interconnected over a network where the TCP sender includes the novel fast recovery extended method of this invention.
Figure 2C:
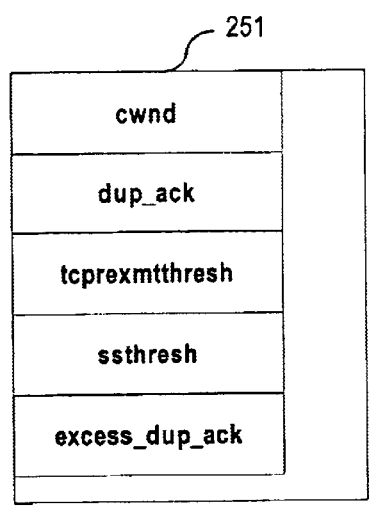
FIG. 2C is a more detailed diagram of fast recovery extended state variables that are stored in a memory.
Figure 2B:
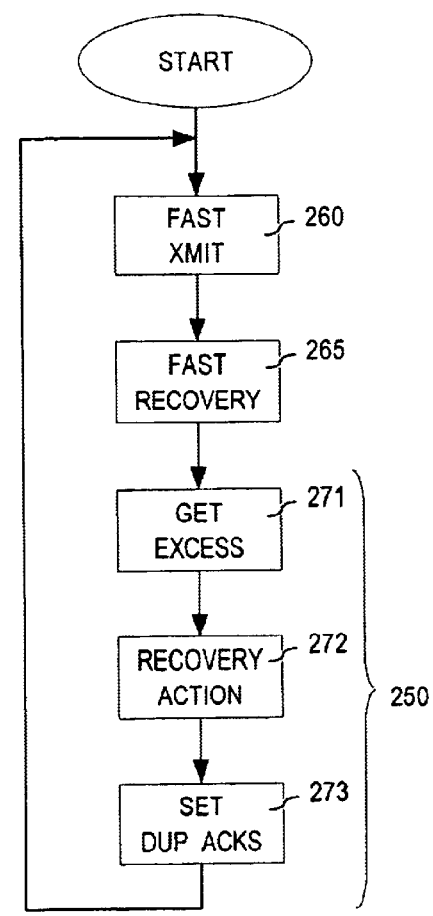
FIG. 2B is a high level process flow diagram of the fast recovery extended method of this invention.

When the number of duplicate acknowledgements is equal to duplicate acknowledgement threshold tcprexmtthresh, a first fast retransmit 260 is performed, and congestion window cwnd is resized. In response to each subsequent duplicate acknowledgement in fast recovery 265, the size of congestion window cwnd is increased, and if permitted another segment is transmitted. The count of consecutive duplicate acknowledgements received is maintained in memory area 251(FIG. 2B).

When an acknowledgement packet for the retransmitted segment is received from TCP receiver 210, fast recovery 265 (FIG. 2B) transfers to fast recovery extended method 250.

Get excess operation 271 in method 250 determines an excess number of duplicate acknowledgements based upon the count of consecutive duplicate acknowledgements stored in memory area 251 and the number of segments acknowledged in the acknowledgement packet for the retransmitted segment. In this embodiment, the excess number of duplicate acknowledgements is stored in excess duplicate acknowledgements variable excess dup_ack in memory area 251. Get excess operation 271 transfers to recovery action operation 272.

In recovery action operation 272, TCP sender 200 initiates one or more network packet transmission recovery actions based upon the value of excess duplicate acknowledgements variable excess_dup_ack. The network packet transmission recovery actions include:

Taking no further action;
Deflating a size of congestion window cwnd;
Optimizing a size of congestion window cwnd;
Performing a second fast retransmit;
Resizing the optimized size congestion window cwnd; and
Resizing the deflated size congestion window cwnd.

The specific network packet transmission recovery action or actions taken for a particular value of variable excess_dup_ack is described more completely below. Notice that unlike the prior art fast recovery method, fast recovery extended method 250 uses the knowledge concerning the excess number of duplicate acknowledgements from fast recovery 265 to take an appropriate action to expedite recovery for one or more segment losses in a single round trip time.

Moreover, recovery action 272 transfers to set duplicate acknowledgment operation 273 that effectively sets variable dup_ack equal to variable excess_dup_ack. Here, effectively means that if variable excess_dup_ack is being measured in bytes rather than as an absolute number, variable excess_dup_ack is converted to an absolute number.

Thus, the knowledge concerning the excess number of duplicate acknowledgements is retained for the next application of congestion avoidance. For example, if the excess number of duplicate acknowledgements is two, the next duplicate acknowledgement results in a fast retransmission, because another segment has been lost in the network. Typically, in a similar situation, the prior art fast recovery set the number of duplicate acknowledgements to zero upon completing, and so three new duplicate acknowledgements would be required before a segment would be retransmitted. Consequently, a timeout may have occurred in the prior art method, as described above, that is avoided in this example.

Figure 3A:
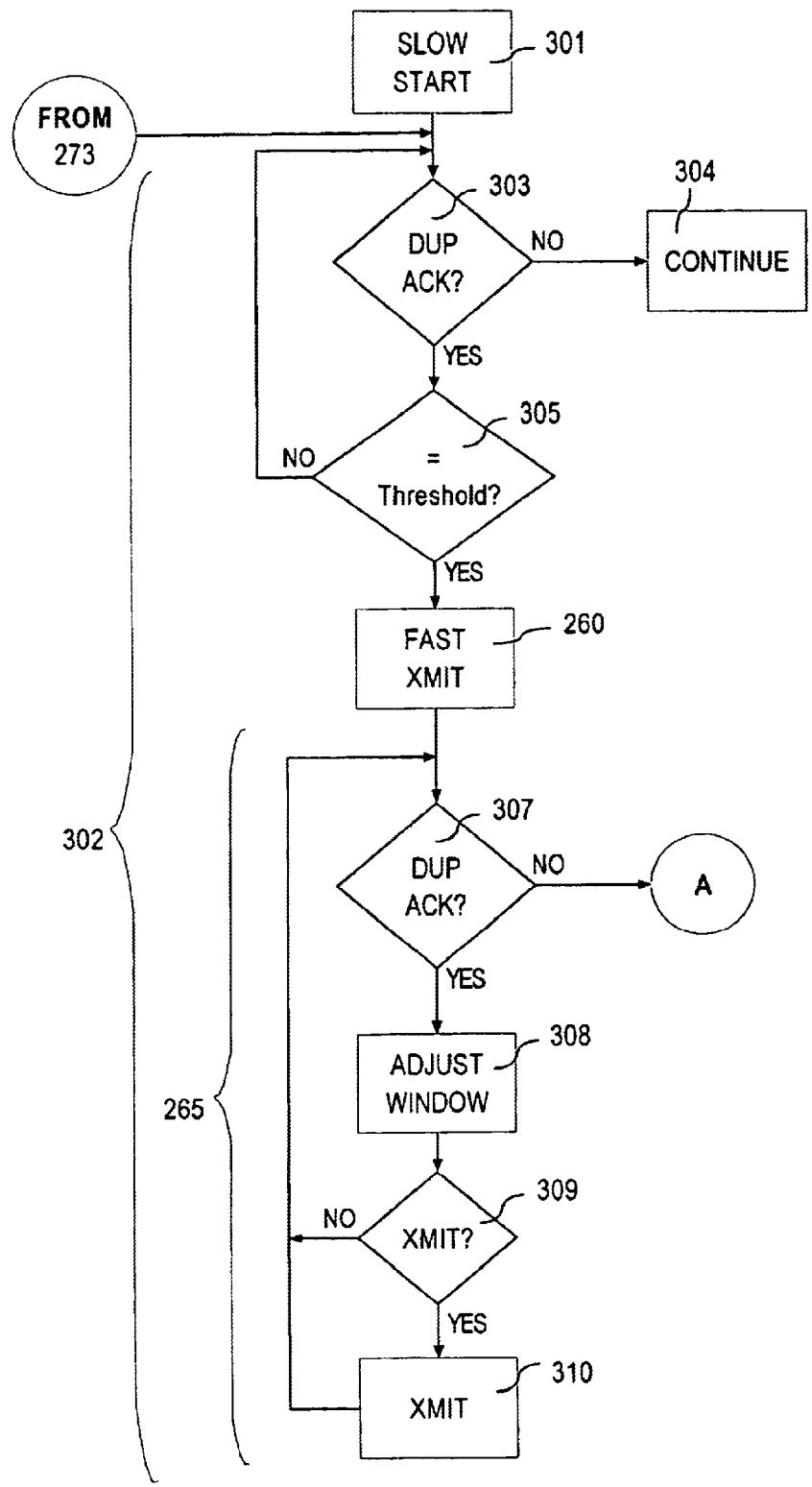
FIGS. 3A and 3B are a detailed process flow diagram of one embodiment of the fast recovery extended method of this invention.
Figure 3B:
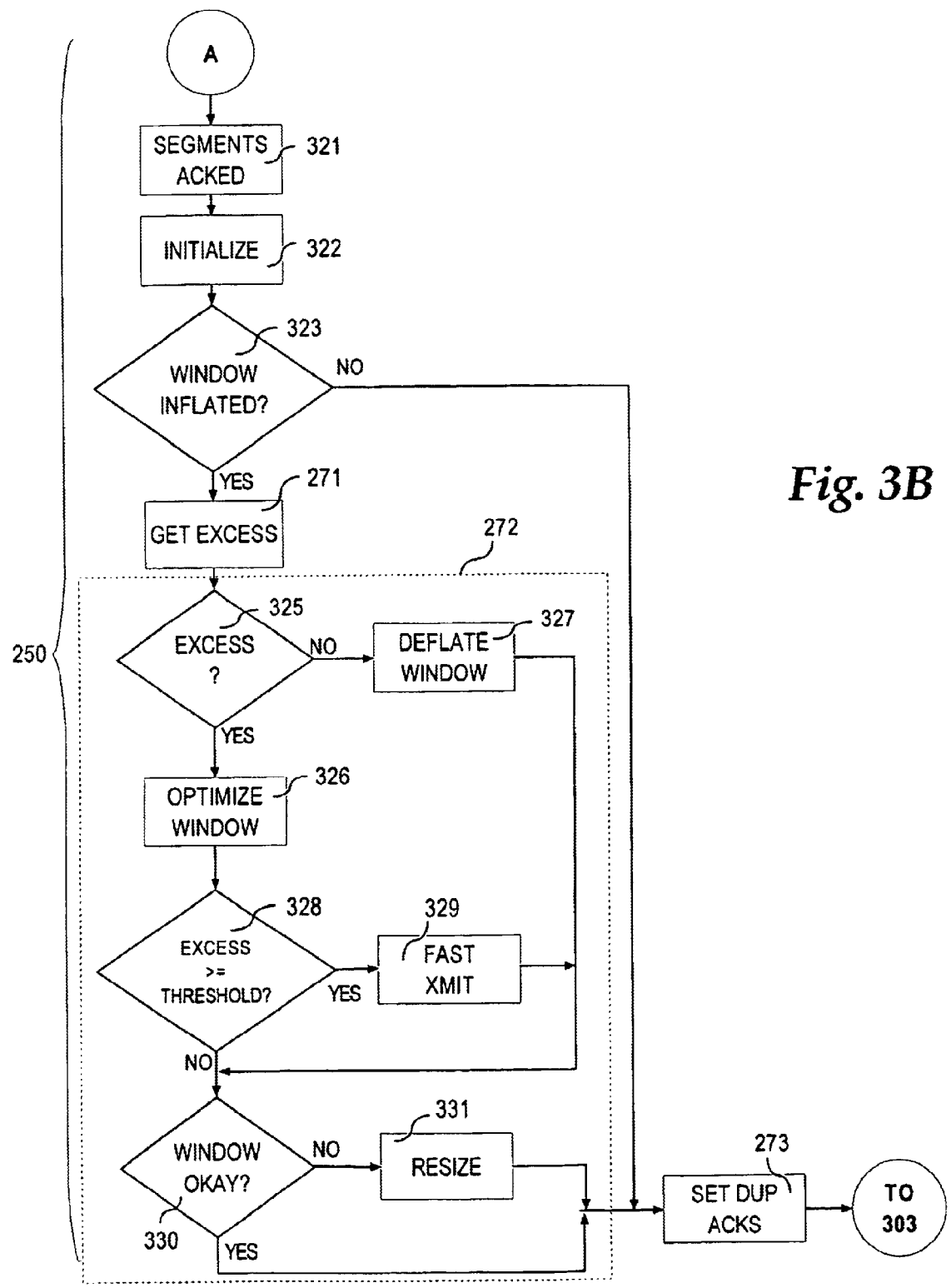

FIGS. 3A and 3B are a more detailed process flow diagram of one embodiment of this invention. When a TCP connection is established between TCP sender 200 and TCP receiver 210 over network 290, data flow is initiated across network 290 using TCP slow start method 301, and so a slow start threshold ssthresh is initialized and stored in fast recovery extended state data 251 in memory 202. Similarly, congestion window cwnd is initialized and stored in fast recovery extended state data 251 in memory 202. Another parameter that is initialized is a duplicate acknowledgement threshold tcprexmtthresh, which is the number of consecutive duplicate acknowledgements that must be received by TCP sender 200 prior to initiating fast retransmit process 260, i.e., a predefined number of duplicate acknowledgements. Typically, duplicate acknowledgement threshold tcprexmtthresh is set to three.

In addition, all normal TCP parameters have been initialized including TCP sender's maximum segment size maxseg, and TCP receiver's advertised window tiwin. The initialization of TCP is known to those of skill in the art and so is not considered further. See for example, Gary R. Wright and W. Richard Stevens, TCP/IP Illustrated, Volume 2, Addison Wesley, Reading, Mass., (1995), which is incorporated herein by reference as an example of the level of skill in the art.

In slow start method 301, congestion window cwnd is increased each time receipt of new data is acknowledged by TCP receiver 210. So long as congestion window cwnd is less than or equal to slow start threshold ssthresh, TCP sender 200 remains in slow start method 301. Otherwise, TCP sender 200 exits slow start method 301 and enters congestion avoidance method 302.

In congestion avoidance method 302, TCP sender 200 monitors the number of duplicate acknowledgements received from TCP receiver 210. In particular duplicate acknowledge check operation 303 determines whether an acknowledgement packet received from TCP receiver 210 is a duplicate acknowledgement. Testing for a duplicate acknowledgement is well known in the art and so is not considered further herein. See for example, Wright and Stevens that is cited above.

If the acknowledgement packet is not a duplicate, operation 303 transfers to continue 304 and TCP sender 200 and receiver 210 communicate according to TCP. Conversely, if the acknowledgement packet is a duplicate, duplicate acknowledgement check operation 303 transfers to equals threshold check operation 305.

Equals threshold check operation 305 compares the number of duplicate acknowledgements received with duplicate acknowledgement threshold tcprexmtthresh. If the number of received duplicate acknowledgements is less than duplicate acknowledgement threshold tcprexmtthresh, operation 305 returns to duplicate acknowledgement check operation 303, and otherwise transfers to a first fast retransmit operation 260. Initially, for this example, assume that the size of congestion window cwnd is C segments.

Also assume that TCP sender 200 has transmitted C segments to TCP receiver 210 and cannot send any more segments until an acknowledgement of receipt of new data by TCP receiver 210 is received. Instead of an acknowledgement of receipt of new data, TCP sender 200 receives three duplicate acknowledgement packets from TCP receiver 210.

Upon receipt of the third duplicate acknowledgement, TCP sender 200 transfers from check operation 305 to first fast retransmit process 260. TCP sender 200 interprets the three duplicate acknowledgements as indicating that a segment has been lost over network 290, because, in this example and typically, duplicate acknowledgement threshold tcprexmtthresh is three.

In fast retransmit process 260, TCP sender 200 first sets the value of slow start threshold ssthresh to one-half the current value of congestion window cwnd, with a minimum value of two segments, i.e., the value of the current congestion window cwnd is saved. A retransmission timer is turned off, and a round trip time is set to zero in case a segment is being timed. The pointer to the next segment to transmit by TCP sender 200 is set to the byte value received in the latest duplicate acknowledgement packet, and congestion window cwnd is set to the maximum segment size for TCP sender 200.

TCP sender 200 retransmits the missing segment, and sets congestion window cwnd to threshold ssthresh plus the number of segments TCP receiver 210 has cached as indicated by the number of duplicate acknowledgements received, which is three. The next-to-send pointer is moved forward again to address the first new segment, i.e., the first segment that has never been transmitted. This completes first fast transmit process 260, and so processing transfers to duplicate acknowledgement check operation 307 in fast recovery method 265.

As each additional duplicate acknowledgement is received from TCP receiver 210, TCP sender 200 transfers processing from duplicate acknowledgement check operation 307 to adjust window operation 308. In adjust window operation 308, the size of congestion window cwnd is increased by the size of one segment. Accordingly, the difference between threshold ssthresh and the size of congestion window cwnd represents the number of duplicate acknowledgements received by TCP sender 200.

Herein, it is assumed that a segment and the maximum transmission unit are the same size. However, if the maximum transmission unit is different from a segment, method 250 is defined in terms of maximum transmissions units. In general, TCP always sends data as maximum transmission units unless the size of the data waiting to be sent is less than the size of a maximum transmission unit.

Operation 308 transfers to transmit check operation 309. If congestion window cwnd is at least one segment larger than the number of unacknowledged packets, operation 309 transfers to transmit operation 310 and otherwise to duplicate acknowledgement check operation 307. The reduced size of congestion window cwnd prevents TCP sender from immediately transmitting additional segments, and processing cycles through operations 307 to 309.

After (C/2−2) duplicate acknowledgements, adjust window operation 308 increases congestion window cwnd to a size of (C+1) segments, and so transmit check operation transfers to transmit operation 310 in which TCP sender 200 transmits another segment. Hence, the number of unacknowledged segments is (C+1) segments. For each additional duplicate acknowledgement received by TCP sender 200, processing-goes from check operation to adjust window operation 308 in which congestion window cwnd is incremented. Consequently, another segment is transmitted in operation 310. This sequence of operations 307 to 310 continues until (C−D) duplicate acknowledgements are received by TCP sender 200 at which time ((3C/2)−D) unacknowledged segments have been transmitted, and congestion window cwnd has a size ((3C/2)−D) segments, where D is the number of segments dropped in one round trip time.

At this point, TCP receiver 210 has sent duplicate acknowledgements for all the segments sent prior to the receipt of the retransmitted segment. When TCP receiver 210 receives the retransmitted segment, TCP receiver 210 not only acknowledges the retransmitted segment, but also each additional consecutive segment in the buffer of TCP receiver 210, which in this example is X additional segments. Consequently, the acknowledgement packet from TCP receiver 210 that acknowledges new data acknowledges the retransmitted segment and co-acknowledges X additional segments.

In the prior art at this point, duplicate acknowledgement check operation 307 would transfer to an operation in which TCP sender 200 set the number of duplicate acknowledgements to zero, and set congestion window cwnd equal to slow start threshold ssthresh. Consequently, all information concerning the number of duplicate acknowledgements that was stored in congestion window cwnd was lost in the prior art fast recovery method.

However, as indicated above, fast recovery extended method 250 of this invention, does not automatically terminate upon receipt of an acknowledgement packet for the retransmitted segment. Prior to considering the specific operations performed when duplicate acknowledge operation 307 detects other than a duplicate acknowledgement, consider that at this point in time, TCP sender 200 cannot be sure of the relationship between the number of duplicate acknowledgements received, and the number X of co-acknowledged segments. While it is true that TCP receiver 210 generated a duplicate acknowledgement for each of the X co-acknowledged segments, some of the X duplicate acknowledgements may have been lost in network 290 (FIG. 2A). Conversely, some of the duplicate acknowledgements may be for segments following the X co-acknowledged segments.

TCP sender 200 does know, however, that TCP receiver 210 must have received the larger of the number of duplicate acknowledgements and the number of co-acknowledged packets. Hence, according to the principles of this invention, TCP sender 200 uses this knowledge to determine the action to be taken in response to the acknowledgement packet that acknowledged the retransmitted segment and X additional segments.

Specifically, in segments acknowledged operation 321 in fast recovery extended method 250, TCP sender 200 determines the number of co-acknowledged segments, e.g., X co-acknowledged segments in this example. Operation 321 transfers to initialization operation 322.

Initialization operation 322 sets a next duplicate acknowledgements variable to zero. The next duplicate acknowledgements variable is a key to the fast recovery extended because this variable retains the information about the excess number of duplicate acknowledgements that is stored in congestion window cwnd, as explained more completely below. Initialization operation 322 transfers processing to inflated window check operation 323.

Inflated window check operation 323 determines whether congestion window cwnd was increased in size after the three duplicate acknowledgments were received. If congestion window cwnd was not inflated, processing transfers to set duplicate acknowledgements operation 273 and otherwise to get excess operation 271.

In get excess operation 271, TCP sender 200 first determines the excess number of duplicate acknowledgements. Specifically, TCP sender 200 determines the inflation in congestion window cwnd and then subtracts the total number of acknowledged segments to determine the excess number of duplicate acknowledgements. Operation 271 transfers to excess check operation 325.

In particular, if the excess number of duplicate acknowledgements is greater than or equal to one, excess check operation 325 transfers processing to optimize window operation 326, and otherwise to deflate window operation 327. If excess check operation 325 transfers to deflate window operation 327, the co-acknowledgement completely accounts for the duplicate acknowledgements previously received, and so the count of duplicate acknowledgements conveys no additional information. Thus, extended recovery operations are not warranted, and deflate window operation sets congestion window cwnd equal to slow start threshold ssthresh, and transfers to window okay check operation 330, which is described more completely below.

However, if the number of duplicate acknowledgements is greater than the number X of co-acknowledged segments, TCP sender 200 knows that TCP receiver 210 has received segments which cannot yet be explicitly acknowledged. This may be because a second segment was lost in network 290, or some segments were received out of order. Consequently, unlike the prior art that simply dropped the information concerning the excess duplicate acknowledgements, excess check operation 325 transfers to optimize window operation 326, as indicated above.

As in the prior art fast recovery method, the intent of fast recovery extended method 250 is to keep the number of packets in flight constant until recovery is complete. The excess number of duplicate acknowledgements is grounds for considering retransmitting another segment. However, congestion window cwnd should be reduced since network 290 is still experiencing congestion as indicated by the loss of another segment. Preferably, the reduction in congestion window cwnd does not result in a congestion window less than the quantity of unacknowledged data when recovery is complete, and does not result in transmission of multiple segments at wire speed. With these criteria, congestion window, in bytes, is defined in optimize window operation 326 as:

New congestion window=old congestion window–(number of co-acknowledged segments+1)–(0.5)(TCP sender maximum segment size).

Operation 326 transfers to excess greater than or equal to threshold check operation 328. Operation 328 compares the excess number of duplicate acknowledgements with duplicate acknowledgement threshold tcprexmtthresh. If the excess number of received duplicate acknowledgements is less than duplicate acknowledgement threshold tcprexmtthresh, operation 328 transfers to window okay check operation 330, and otherwise transfers to fast transmit operation 329.

If the excess number of duplicate acknowledgements is greater than threshold tcprexmtthresh, another segment has been lost and so immediate re-transmission of the oldest unacknowledged segment is justified. Consequently, fast retransmit operation 329, which performs the same operations as fast retransmit operation 260, immediately retransmits the oldest unacknowledged segment. Notice that the second transmission effectively happens immediately after the receipt of the acknowledgement of the first retransmitted segment, and does not have to wait for receipt of three additional duplicate acknowledgements after fast recovery is terminated as in the prior art. Fast retransmit operation 260 transfers to window okay check operation 330.

In window okay check operation 330, if congestion window cwnd is greater than the number of outstanding unacknowledged segments plus three segments, operation 330 transfers to resize operation 331 and otherwise to set dup acks operation 273. In resize operation 331 congestion window cwnd is resized so that a maximum of two segments can be transmitted in arrow, e.g., congestion window cwnd is set to the number of unacknowledged segments plus three segments minus one. Operation 331 transfers to set dup acks operation 273.

In set dup acks operation 273, the excess number of duplicate acknowledgements is converted to an absolute number, if necessary, and stored as the next duplicate acknowledgements variable. Next duplicate acknowledgements variable is set equal to the number of duplicate acknowledgements dup_ack, in contrast to the prior art that set the number of duplicate acknowledgement to zero on leaving the prior art fast recovery method. The retention of the number of duplicate acknowledgements permits the next pass through congestion avoidance in response to the next duplicate acknowledgement to respond more quickly than in the prior art.

For example, if the extra number of duplicate acknowledgements is two, and duplicate acknowledgement check 303 detects another duplicate acknowledgement, threshold check operation 305 transfers to fast retransmit operation 260. Hence, it is no longer necessary upon leaving method 250 that congestion window cwnd permit transmission of three segments before another segment can be retransmitted. Accordingly, a retransmission timeout that would have occurred in the prior art is no longer a problem. Using the knowledge provided by the excess number of duplicate acknowledgements allows a more smooth recovery than was previously possible, and data throughput is maintained.

Consequently, the fast recovery extended method of this invention makes more efficient use of the network and improves throughput for the individual user.

Section I

An embodiment of the fast recovery extended method of this invention follows in the C programming language. This embodiment is illustrative only and is not intended to limit the invention to the particular computer code presented herein.

```c
if (SEQ_LEQ(ti->ti_ack, tp->snd_una)) {
  if (ti->ti_len == 0 && tiwin == tp->snd_wnd) {
    tcpstat.tcps_rcvdupack++;
    if (tp->t_timer[TCPT_REXMT] == 0 ||
        ti->ti_ack != tp->snd_una)
      tp->t_dupacks = 0:
    else if (++tp->t_dupacks ==
             tcprexmtthresh) {
/* tcprexmtthresh is set to 3 in one embodiment*/
      tcp_seg onxt = tp->snd_nxt;
      unsigned int win =
        min(tp->snd_wnd,
            tp->snd_cwnd) / 2 /
        tp->t_maxseg;
      if (win < 2)
        win = 2;
      tp->snd_ssthresh = win *
        tp- >t_maxseg;
      tp->t_timer[TCPT_REXMT] = 0;
      tp->t_rtt = 0;
      tp->snd_nxt = ti->ti_ack;
      tp->snd_cwnd = tp->t_maxseg;
      (void) tcp_output (tp);
      tp->snd_cwnd=tp->snd_ssthresh+
        tp->t_maxseg*tp->t_dupacks;
      if (SEQ_GT(onxt, tp->snd_nxt))
        tp->snd_nxt = onxt;
        goto drop;
    } else if (tp->t_dupacks >
               tcprexmtthresh) {
      tp->snd_cwnd += tp->t_maxseg;
      (void) tcp_output(tp);
      goto drop;
    }
  } else
    tp->t_dupacks = 0;
  break;
}
/* compute amount of data acked by this ack*/
  acked = ti->ti_ack - tp->snd_una;
/* default value to assign to t_dupacks */
  unsigned int next_dup_acks = 0;
  if (tp->t_dupacks > tcprexmtthresh &&
      tp->snd_cwnd > tp->snd_ssthresh) {
/* progressive ack after dup acks and retransmission*/
/* hold off further increasing cwnd for now*/
    incr = 0;
    int excess_dup_ack =
      tp->snd_cwnd - tp->snd_ssthresh - acked
      if (excess_dup_ack<(int)tp->t_maxseg) {
/* Normal case: no excess dupack count worth using*/
        tp->snd_cwnd = tp->snd_ssthresh; }
      else {
/* cwnd is reduced to match the reduction in the
// quantity of unacked data. Thus, congestion window
// is chosen as
//        cwnd -= acked - maxseg/2;
// combined with ensuring tp->snd_cwnd is not too
// high at the end, i.e., making
//        cwnd <= snd_nxt-snd_una
//            + tcprexmtthresh*maxseg - 1
// */
        tp->snd_cwnd -= acked -tp->t_maxseg/2;
        next_dup_acks = excess_dup_ack /
                        tp->t_maxseg;
        if(next_dup_acks >= tcprexmtthresh) {
```

-continued

```
/* There must have been a second drop,
// Retransmit the oldest unacknowledged packet
*/
        tcp_seq onxt = tp->snd_nxtp;
/* Save congestion avoidance state*/
        unsigned int save_cwnd = tp->snd_cwnd;
        unsigned int win =min(tP->snd_wnd,
            tp->snd_cwnd) / 2 /
                tp->t_maxseg;
        if (win < 2)
            win = 2;
        tp->snd_ssthresh = win *
            tp->t_maxseg;
        tp->snd_cwnd = tp->t_maxseg;
        tp->snd_nxt = ti->ti_ach;
        (void) tcp_output(tp);
        if (SEQ_GT(onxt, tp->snd_nxt))
            tp->snd_nxt = onxt;
/* Restore congestion window*/
        tp->snd_cwnd = save_cwnd;
        }
    }
    if(tp->snd_cwnd>= tp->snd_nxt - tp->snd_una +
            tcprexmtthresh*tp-
>t_maxseg) {
        tp->snd_cwnd = tp->snd_nxt - tp->snd_una
            tcprexmtthresh*tp->t_maxseg -1;
        }
}
tp->t_dupacks = next_dup_acks;
    if (SEQ_GT(ti->ti_ack, tp->snd_max)) {
        tcpstat.tcps_rcvacktoomuch++;
        goto dropafterack;
    }
    tcpstat.tcps_rcvackpack++;
    tcpstat.tcps_rcvackbyte += acked;
```

I claim:

1. A network device-based method comprising:

sending a plurality of packets;

receiving a plurality of acknowledgements, wherein each of the plurality of acknowledgements acknowledges receipt of at least one of the plurality of packets, wherein the plurality of acknowledgements includes at least one duplicate acknowledgement containing no more information than is contained in a previously received one of the plurality of acknowledgements;

determining and retaining, upon receiving the plurality of acknowledgements, an excess number of duplicate acknowledgements, by at least determining a number representing how many additional packets were co-acknowledged with the duplicate acknowledgments;

wherein the excess number of duplicate acknowledgements is a number that is determined based upon a difference between a count of consecutive duplicate acknowledgement packets and the number of co-acknowledged packets; and taking a network packet transmission recovery action based upon said excess number of duplicate acknowledgements.

2. The network device-based method of claim 1 further comprising:

determining whether a congestion window is inflated prior to deciding whether to determine said excess number of duplicate acknowledgements.

3. The network device-based method of claim 1 wherein a value of the excess number of duplicate acknowledgements is a count of bytes in the duplicate acknowledgements used to determine the excess number of duplicate acknowledgements and wherein said taking a network packet transmission recovery action further comprises:

deflating a congestion window upon said value being less than a number of bytes in a transmission control protocol sender segment.

4. The network device-based method of claim 1 wherein said taking a network packet transmission recovery action further comprises:

optimizing a size of a congestion window to match a reduction in a quantity of unacknowledged data upon said excess number of duplicate acknowledgements being greater than a TCP sender segment.

5. The network device-based method of claim 1 wherein said taking a network packet transmission recovery action further comprises:

comparing said excess number of duplicate acknowledgements with a duplicate acknowledgement threshold.

6. The network device-based method of claim 5 wherein said taking a network packet transmission recovery action further comprises:

performing a fast retransmit upon said comparing said excess number of duplicate acknowledgements with a duplicate acknowledgement threshold indicating that said excess number of duplicate acknowledgements is greater than or equal to said duplicate acknowledgement threshold.

7. The network device-based method of claim 6, wherein said taking a network packet transmission recovery action further comprises:

analyzing a size of a congestion window.

8. The network device-based method of claim 7, wherein said taking a network-packet transmission recovery action further comprises:

resizing said congestion window upon said analyzing said size of said congestion window showing said size is greater than a predefined size.

9. The network device-based method of claim 5, wherein said taking a network packet transmission recovery action further comprises:

analyzing a size of a congestion window upon said comparing said excess number of duplicate acknowledgements with a duplicate acknowledgement threshold indicating that said excess number of duplicate acknowledgements is less than said duplicate acknowledgement threshold.

10. The network device-based method of claim 9, wherein said taking a network packet transmission recovery action further comprises:

resizing said congestion window upon said analyzing said size of said congestion window showing said size is greater than a predefined size.

11. The network device-based method of claim 1 wherein said method is included in Transmission Control Protocol congestion avoidance.

12. A method according to claim 1, wherein the taking of the network packet transmission recovery action based on the excess number of duplicate acknowledgements includes at least:

determining based on the excess number of duplicate acknowledgements whether the number of duplicate acknowledgements is equal to or less than the number of co-acknowledged segments;

if the number of duplicate acknowledgements is equal to or less than the number of co-acknowledged segments determining the network packet transmission recovery action based on the number of duplicate acknowledgements; and if the number of duplicate acknowledgements is not equal to or less than the number of co-acknowledged segments determining the network packet transmission recovery action based on the excess number of duplicate acknowledgements.

13. A network device-based method comprising:

receiving a plurality of acknowledgements, wherein each of the plurality of acknowledgements acknowledges receipt of at least one of the plurality of packets;

wherein the plurality of acknowledgements includes at least one duplicate acknowledgement, which is an acknowledgement containing no more information than is contained in a previously received acknowledgement of one of the plurality of acknowledgements;

determining and retaining, upon receiving the plurality of acknowledgements, an excess number of duplicate acknowledgements, by at least determining a number representing how many additional packets were acknowledged with the duplicate acknowledgements, which are thereby co-acknowledged packets;

wherein the excess number of duplicate acknowledgements is a number that is determined based upon a difference between a count of consecutive duplicate acknowledgement packets and the number of co-acknowledged packets; and deflating a congestion window upon said value of said excess number of duplicate acknowledgements being less than a transmission control protocol sender segment; and optimizing a size of said congestion window to match a reduction in a quantity of unacknowledged data upon said excess number of duplicate acknowledgements being greater than a transmission control protocol sender segment.

14. The network device-based method of claim 13 wherein a value of the excess number of duplicate acknowledgements is a count of bytes in the duplicate acknowledgements used to determine the excess number of duplicate acknowledgements and further comprising:

comparing said excess number of duplicate acknowledgements with a duplicate acknowledgement threshold upon said excess number of duplicate acknowledgements being greater than a number of bytes in a TCP sender segment.

15. The network device-based method of claim 14 further comprising:

performing a fast transmit upon said comparing said excess number of duplicate acknowledgements with a duplicate acknowledgement threshold indicating that said excess number of duplicate acknowledgements is greater than or equal to said duplicate acknowledgement threshold.

16. The network device-based method of claim 15 further comprising:

analyzing a size of said congestion window.

17. The network device-based method of claim 16 comprising:

resizing said congestion window upon said analyzing said size of said congestion window showing said size is greater than a predefined size.

18. The network device-based method of claim 13 comprising:

analyzing a size of said congestion window upon said comparing said excess number of duplicate acknowledgements with a duplicate acknowledgement threshold indicating that said excess number of duplicate acknowledgements is less than said duplicate acknowledgement threshold.

19. The network device-based method of claim 18 further comprising:

resizing said congestion window upon said analyzing said size of said congestion window showing said size is greater than a predefined size.

20. The network device-based method of claim 13 wherein said method is included in Transmission Control Protocol congestion avoidance.

21. A network device comprising:

a processor; and a memory coupled to said processor, and storing a fast recovery extended method wherein upon execution of said fast recovery extended method by said processor, causes said network device to:

send a plurality of packets;

receive a plurality of acknowledgements, wherein each of the plurality of acknowledgements acknowledges receipt of at least one of the plurality of packets;

wherein the plurality of acknowledgements includes at least one duplicate acknowledgement, which is an acknowledgement containing no more information than is contained in a previously received acknowledgement of one of the plurality of acknowledgements;

determine, upon receiving acknowledgement of receipt of the plurality of acknowledgements, an excess number of duplicate acknowledgements, by at least determining a number representing how many additional packets were acknowledged with the duplicate acknowledgements, which are thereby co-acknowledged packets;

wherein the excess number of duplicate acknowledgements is a number that is determined based upon a difference between a count of consecutive duplicate acknowledgement packets and the number of co-acknowledged packets;

retain said excess number of duplicate acknowledgements in said memory; and take a network packet transmission recovery action based upon said excess number of duplicate acknowledgements.

22. The network device of claim 21, wherein said fast recovery extended method further comprises:

determining whether a congestion window is inflated prior to deciding whether to determine said excess number of duplicate acknowledgements.

23. The network device of claim 21, wherein a value of the excess number of duplicate acknowledgements is a count of bytes in the duplicate acknowledgements used to determine the excess number of duplicate acknowledgements and wherein said taking a network packet transmission recovery action further comprises:

deflating a congestion window upon said value of said excess number of duplicate acknowledgements being less than a number of bytes in a transmission control protocol sender segment.

24. The network device of claim 21, wherein said taking a network packet transmission recovery action further comprises:

optimizing a size of a congestion window to match a reduction in a quantity of unacknowledged data upon said excess number of duplicate acknowledgements being greater than a TCP sender segment.

25. The network device of claim 21, wherein said taking a network packet transmission recovery action further comprises:
comparing said excess number of duplicate acknowledgements with a duplicate acknowledgement threshold.

26. The network device of claim 25 wherein said taking a network packet transmission recovery action further comprises:
performing a fast retransmit upon said comparing said excess number of duplicate acknowledgements with a duplicate acknowledgement threshold indicating that said excess number of duplicate acknowledgements is greater than or equal to said duplicate acknowledgement threshold.

27. The network device of claim 26, wherein said taking a network packet transmission recovery action further comprises:
analyzing a size of a congestion window.

28. The network device of claim 27, wherein said taking a network packet transmission recovery action further comprises:
resizing said congestion window upon said analyzing said size of said congestion window showing said size is greater than a predefined size.

29. The network device of claim 25, wherein said taking a network packet transmission recovery action further comprises:
analyzing a size of a congestion window upon said comparing said excess number of duplicate acknowledgements with a duplicate acknowledgement threshold indicating that said excess number of duplicate acknowledgements is less than said duplicate acknowledgement threshold.

30. The network device of claim 29, wherein said taking a network packet transmission recovery action further comprises:
resizing said congestion window upon said analyzing said size of said congestion window showing said size is greater than a predefined size.

31. The network device of claim 21, wherein said method is included in Transmission Control Protocol congestion avoidance.

32. A programmable memory including a fast recovery extended method wherein said fast recovery extended method upon execution comprises:
sending a plurality of packets;
receiving a plurality of acknowledgements, wherein each of the plurality of acknowledgements acknowledges receipt of at least one of the plurality of packets;
wherein the plurality of acknowledgements includes at least one duplicate acknowledgement which is an acknowledgement containing no more information than is contained in a previously received acknowledgement of one of the plurality of acknowledgements:
determining and retaining, upon receiving the plurality of acknowledgements, an excess number of duplicate acknowledgements, by at least determining a number representing how many additional packets were acknowledged with the duplicate acknowledgements, which are thereby co-acknowledged packets;
wherein the excess number of duplicate acknowledgements is a number that is determined based upon a difference between a count of consecutive duplicate acknowledgement packets and the number of co-acknowledged packets; and
taking a network packet transmission recovery action based upon said excess number of duplicate acknowledgements.

33. A network device comprising:
means for sending a plurality of packets:
means for receiving a plurality of acknowledgements, wherein each of the plurality of acknowledgements acknowledges receipt of at least one of the plurality of packets;
wherein the plurality of acknowledgements includes at least one duplicate acknowledgement, which is an acknowledgement containing no more information than is contained in a previously received acknowledgement of one of the plurality of acknowledgements;
means for determining, upon receiving the plurality of acknowledgements, an excess number of duplicate acknowledgements,
by at least determining a number representing how many additional packets were acknowledged with the duplicate acknowledgements, which are thereby co-acknowledged packets;
wherein the excess number of duplicate acknowledgements is a number that is determined based upon a difference between a count of consecutive duplicate acknowledgement packets and the number of co-acknowledged packets; and
means for retaining said excess number of duplicate acknowledgements; and
means for taking a network packet transmission recovery action based upon said excess number of duplicate acknowledgements.

34. A method for recovery of multiple transmission units comprising:
transmitting a plurality of transmission units from a sender to a receiver,
wherein the receiver is an entity that is currently receiving transmission units, and
wherein the sender is an entity that is currently sending the transmission units;
the receiver transmitting acknowledgements of receipt of the transmission units received;
setting a duplicate acknowledgements threshold, wherein a duplicate acknowledgement is an acknowledgement of receipt of a transmission unit for which an acknowledgement already exists;
setting a size for a congestion window;
determining a value representing a count of consecutive duplicate acknowledgements;
if the value is equal to the duplicate acknowledgement threshold,
performing a first fast retransmit operation in which at least one of the transmission units is retransmitted, and
resizing the size of the congestion window;
determining whether any subsequent duplicate acknowledgements were received;
in response to receipt of each of the subsequent duplicate acknowledgements,
increasing the size of the congestion window, and
if transmitting another segment is permitted, transmitting another segment; and when an acknowledgement for the transmission unit that was retransmitted is received,
performing a fast recovery including at least
a get excess operation which at least determines a value representing an excess number of duplicate acknowledgements by at least determining a number representing how many additional packets were acknowledged with the duplicate acknowledgements, which are thereby co-acknowledged packets;
wherein the excess number of duplicate acknowledgements is a number that is determined based upon a difference between the value of the count of consecutive duplicate acknowledgements for the retransmitted transmission units and the number of co-acknowledged packets;
a recovery action operation, in which at least the sender initiates one or more network packet transmission recovery actions based upon the excess duplicate acknowledgements, wherein the network packet transmission recovery actions include at least
taking no further action,
deflating the size of the congestion window,
resizing the size of the congestion window to a more optimal size,
performing another fast retransmit,
resizing the size of the congestion window from the more optimal size, and
resizing the size congestion window after the deflating, and
a set duplicate acknowledgment operation in which at least the value representing the count of the duplicate acknowledgements is set equal to the value representing the excess duplicate acknowledgements.

* * * * *

UNITED STATES PATENT AND TRADEMARK OFFICE
CERTIFICATE OF CORRECTION

PATENT NO. : 6,958,997 B1  
DATED : October 25, 2005  
INVENTOR(S) : Derek W. Bolton It is certified that error appears in the above-identified patent and that said Letters Patent is hereby corrected as shown below:

Column 15,  
Line 57, delete "claim 16" and insert -- claim 16 further --.  
Line 62, delete "claim 13" and insert -- claim 13 further --.

Column 17,  
Line 52, delete "acknowledgement which" and insert -- acknowledgement, which --.

Signed and Sealed this

Twenty-fourth Day of January, 2006

JON W. DUDAS  
*Director of the United States Patent and Trademark Office*